Oct. 7, 1969

R. V. DE LEO 3,470,740

LIFT RESERVE INDICATOR SYSTEM

Filed Feb. 10, 1967

INVENTOR.
RICHARD V. DE LEO
BY
Dugger Peterson Johnson + Westman
ATTORNEYS $C_L$ = COEFFICIENT OF LIFT $C_{L\,SW}$ = COEFFICIENT OF STALL WARNING $\alpha_W$ = WING ANGLE OF ATTACK $\alpha_{SW}$ = WING ANGLE AT STALL WARNING $\alpha_S$ = WING ANGLE AT STALL INVENTOR.
RICHARD V. DE LEO
BY
Dugger Peterson Johnson & Westman
ATTORNEYS United States Patent Office 3,470,740
Patented Oct. 7, 1969

3,470,740
LIFT RESERVE INDICATOR SYSTEM
Richard V. De Leo, Hopkins, Minn., assignor to Rosemount Engineering Company, Minneapolis, Minn., a corporation of Minnesota
Filed Feb. 10, 1967, Ser. No. 615,123
Int. Cl. G01c 23/00
U.S. Cl. 73—178                                                 1 Claim

ABSTRACT OF THE DISCLOSURE

A lift reserve indicator for aircraft which indicates whether there is a capability for additional movement of the aircraft, or if the aircraft is near stall. A differential pressure sensed between two ports on a probe is the only external sensing needed. The probe is located on the aircraft such that the differential pressure between the two ports is zero when the lift reserve for the aircraft is zero. The pressure difference at the ports at flow angles other than the zero lift reserve is proportional to the product of angle and dynamic pressure, and a meter is calibrated to indicate the amount of lift reserve available for the aircraft.

BACKGROUND OF THE INVENTION

Field of the invention

The present invention relates to instrumentation for use in aircraft and more particularly to instrumentation which will give the pilot a direct indication of his flight condition in relation to the maximum safe lift of the aircraft.

Prior art

Many single point stall warning devices have been advanced such as horns which sound when the angle of attack reaches a critical angle of attack, and also there have been devices which will shake the control stick to warn the pilot he has reached the critical angle.

SUMMARY OF THE INVENTION

In many instances high performance jet aircraft are operated right at their performance limits. This is particularly true where the aircraft is operated from short fields and also particularly true where a fighter aircraft for example, is performing evasive maneuvers to avoid being hit by a missile or ground fire. At times such as this, the pilot must operate the aircraft at maximum safe lift and maneuverability and a minimum lift reserve.

The lift from an airfoil, such as the wing is roughly linearly proportional to the airfoil angle of attack. Whenever the angle of attack is increased the lift also increases up to a critical angle where the air flow breaks away from the airfoil upper surface resulting in loss of lift, increased drag and unresponsive control surfaces. This is commonly known as the "stalling point" of an aircraft, and any increase of angle of attack after this critical point is reached results in a decrease in lift. A maximum safe angle of attack below stall angle should be selected as a zero lift reserve condition and this angle should not be exceeded. In order to have any maneuvering ability, the aircraft must have a certain amount of lift reserve. It is important when an aircraft is being operated at low lift reserve or close to stalling condition, that the pilot be aware of his situation.

It has been found that the lift of an airfoil or aircraft is primarily a function of the product of the dynamic pressure ($q$) and the wing angle of attack ($\alpha$). During normal level flying, the dynamic pressure will be changing, as will the angle of attack, and the product of the two give accurate sensing of the lift developed by the aircraft. At constant aircraft weight in level flight the product of $\alpha q$ will be constant. In banked and maneuvering flight the lift developed also can readily be obtained from the product of the two parameters.

As disclosed, the pressure sensing head has a curved or tapered leading surface with two ports thereon. The head or probe is mounted to an aircraft or flight vehicle. The differential pressure is sensed between the two ports using a differential pressure sensor. The sensing head is located on the flight vehicle such that the differential pressure between the two ports is zero at the maximum safe angle of attack or in other words when the lift reserve of the vehicle is zero. The point at which lift reserve is zero is indicated on a meter reading directly from the sensor. The pressure difference at the two ports at flow angles other than zero lift reserve is proportional to the product of angle and dynamic pressure.

The lift reserve indicator will operate whether the aircraft is in a tight bank or in a non-banked level flight condition. The instrument can be calibrated in various terms, for example lift reserve in "g" units which is the form shown, or can be calibrated in terms of aircraft velocity over the velocity of the aircraft at stall, or $V/v_s$.

It is therefore an object of the present invention to present a lift reserve indicator for use in aircraft.

It is another object of the present invention to present a lift reserve indicator that can be operated merely through the use of a differential pressure sensor with one external probe.

Other objects are inherent in the specification and will become apparent as the description proceeds.

Figure 1:
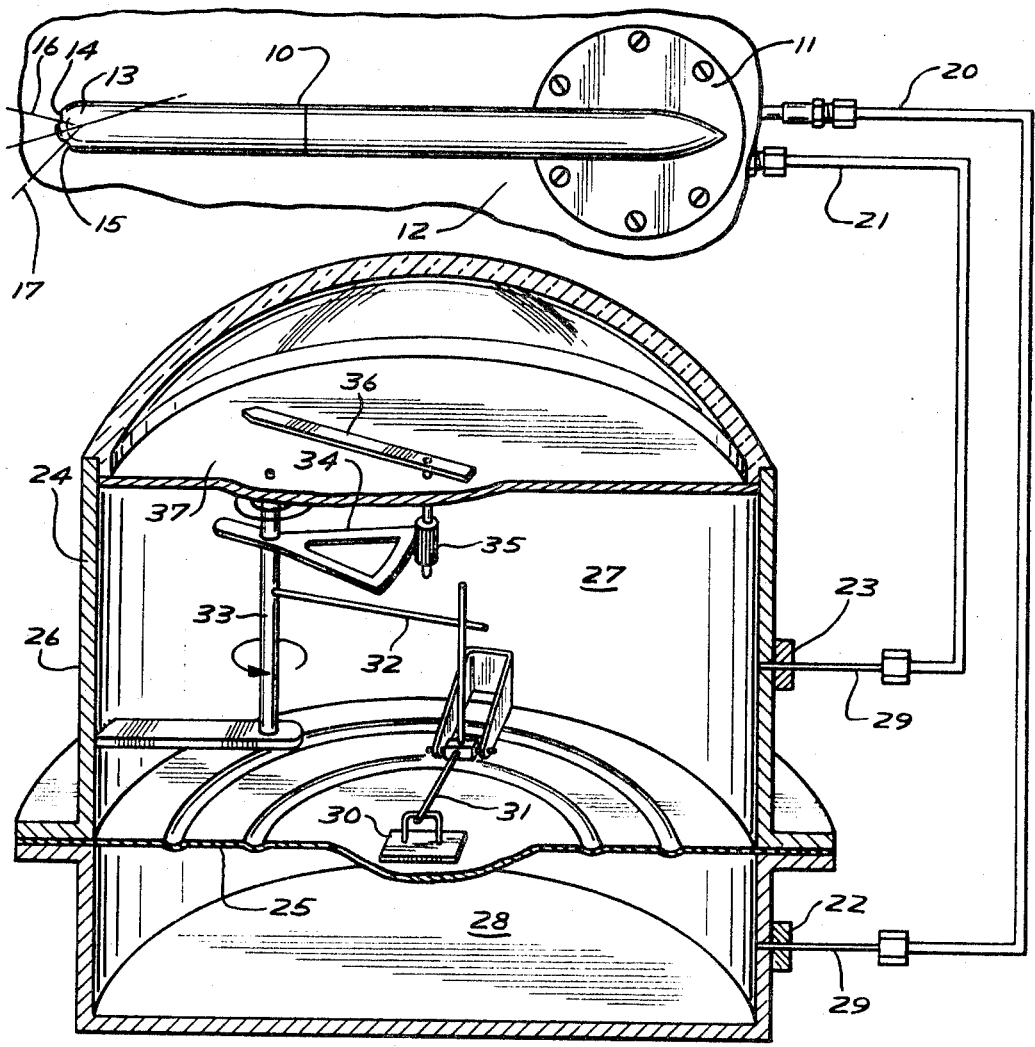
FIG. 1 is a schematic representation of a probe and pressure sensor utilized in the lift reserve indicator of the present invention.

Referring to the drawings and the numerals of reference thereon, a probe 10 is mounted through a base member 11 onto the skin 12 of an aircraft. The probe is spaced outwardly from the skin of the aircraft and is mounted on the fuselage as shown. The longitudinal axis of the probe itself is substantially coincidental with the axis of the aircraft. The probe, at its outer ends, has a hemi-spherical end surface, as shown at 13, and in this end surface there are two ports 14 and 15, respectively, defined therethrough. The ports are defined in the wall of the tube and have axes indicated at 16 and 17, respectively, which are positioned at angles with respect to the longitudinal axis of the probe. As shown, the bisector of the angle between the probe axes does not lie along the longitudinal axis of the probe and the reason for this will be more fully explained later.

The axes 16 and 17 define a common plane that is substantially vertical when the aircraft is in its normal level flight position.

Each of the ports 14 and 15 is open to a separate tube or passageway inside the probe 10 and these in turn connect to remote lines 20 and 21, respectively. The lines 20 and 21 are then open as at 22 and 23, respectively to a differential pressure transducer 24. The transducer 24 is shown schematically and includes a diaphragm 25 which divides the transducer case 26 into two compartments 27 and 28.

As shown, line 20 leading from the port 14 connects to the chamber 28 and line 21, leading from the port 15 connects to the chamber 27. The transducer 24 is shown schematically, as stated, but will include the mechanism to translate movements of the diaphragm due to differences in pressure between the ports 14 and 15 into rotation of an indicating needle. As shown, a follower 30 is provided in the diaphragm which in turn causes a bell crank 31 to rotate and this strikes an arm 32 that rotates a shaft 33 to drive a gear sector 34 and rotate a gear 35 driven onto an indicating needle 36 which operates in conjunction with a dial face 37.

Therefore movement of the needle 36 in relation to the dial face 37 is dependent upon a differential in pressure between ports 14 and 15 only.

Atmospheric turbulence as caused primarily by wind near clouds causes the local flow angle at the sensing head to change irratically. Frequency of such disturbances vary between 5 and ⅕ cycle per second. For operation in turbulent air it has been found that pneumatic damping must be added for proper instrument operation. This damping is accomplished by a fluid resistor commonly in the form of a small diameter tubing 29, commonly 0.025 inch diameter, inserted into lines 20 and 21 respectively. The length of tubing is selected to give a system time constant of about 0.75 second at sea level e.g. the needle will move to 63.2 percent of a step pressure input in about 0.75 second. The resistor or resistors may be conveniently added to threaded attachments at the rear of the instrument case of the pressure transducer. The tubing is thus remote from the pressure sensing head and much less likely to become contaminated by dirt and foreign material. It is also good practice to "strain" the air entering and leaving the resistor and transducers through an instrument type filter usually fabricated of sintered metal.

Figure 3:
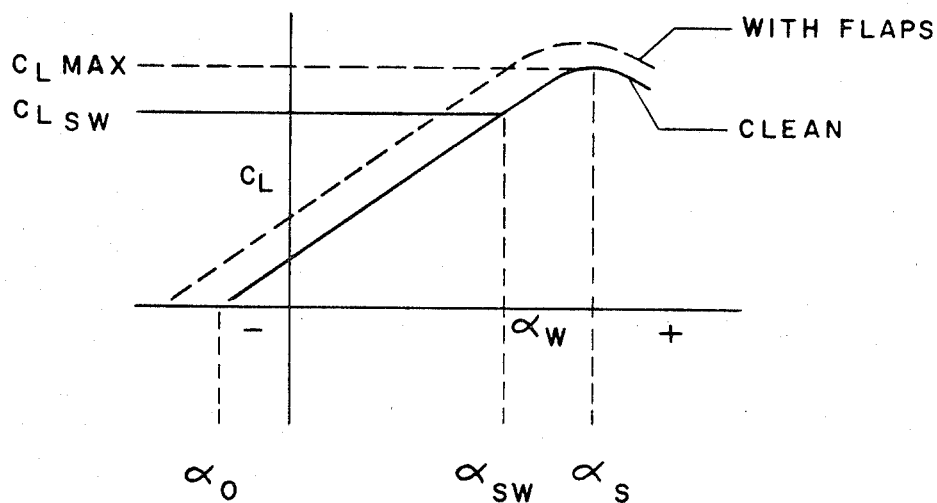
FIG. 3 is a graphic representation of a curve plotted as co-efficient of lift Vs airfoil angle for a typical airfold.

The wing lift, as stated previously, is primarily a function of dynamic pressure, $q$, and wing angle of attack is shown in the following equations:

(1) $L = C_L q S = K_1 q$ (at a given $\alpha_w$)
(2) $L = (\alpha_w - \alpha_o)(dC_L/d\alpha) qS = K_2 q(\alpha_w - \alpha_o)$ where $C_L$ = lift coefficient
$S$ = wing area
$K_1 = C_L S$
$q = \frac{1}{2}\rho V^2 = \gamma/2 PM^2$
$\alpha_w$ = wing angle of attack
$\alpha_o$ = wing angle when $C_L = 0$
$dC_L/d\alpha$ = slope of curve plotted $C_L$ vs. $\alpha_w$ (FIGURE 3)

These relationships are shown graphically in FIGURE 3. In some point below the maximum lift, or which is also known as the stall point of an aircraft, it is desirable to indicate to the pilot that he is approaching the place of maximum lift or the point where he has no lift reserve. Lift reserve can be expressed, then, as the lift at the point of stall warning minus the lift present on the wing. It can be expressed as:

(3) $L_{sw} - L_w = K_2 q (\alpha_{sw} - \alpha_w)$ $\alpha_{sw}$ = wing angle of attack at stall warning
$L_{sw}$ = lift at stall warning
$L_w$ = lift present at the wing It has been previously taught that when two pressure sensor ports located as 14 and 15 are provided and wherein the plane defined by the axes of the ports is the plane of measurement of the flow angle past these ports (or the angle of attack of the aircraft), and where port 15 is considered to be delivering a pressure signal $P_1$ and port 14 is considered to be delivering a pressure signal $P_2$, the expression $P_1 - P_2$ is proportional to the product local flow angle ($\alpha_1$) times the impact pressure ($q$). Expressed algebracially, this is:

(4) $P_1 - P_2 = K_3 \alpha_1 q$ with the condition that $\alpha_1 = 0$ when $\alpha_w = \alpha_{sw}$ or generally that $\alpha_1 = K_4 (\alpha_{sw} - \alpha_w)$. It was previously shown that the lift reserve was proportional to $K_2 q (\alpha_{sw} - \alpha_w)$. Therefore all of the information needed to obtain an indication of lift reserve is available from a two port probe and a differential pressure sensor. Expressed algebraically:

(5) $L_{sw} - L_w = K_2 (P_1 - P_2)/K_3 K_4$

By proper calibration of the needle drive shown schematically in FIGURE 1 (to add in the constants $K_2$, $K_3$ and $K_4$), the pressure transducer will directly indicate lift reserve.

The basic configuration will work for many different cases. The point of zero lift reserve remains constant for all aircraft loading and centers of gravity. However, the other points on the scale will change with loading and center of gravity.

The axes of the ports are positioned so that at the maximum safe aircraft angle of attack or zero lift reserve, $P_1 - P_2$ will equal zero. The instrument becomes a true angle sensor for the zero point.

If desired the ports can be positioned symmetrically on the sensing head and the longitudinal axis of the probe itself rotated to give this relationship of $P_1 - P_2$ equal 0 at zero lift reserve.

Figure 2:
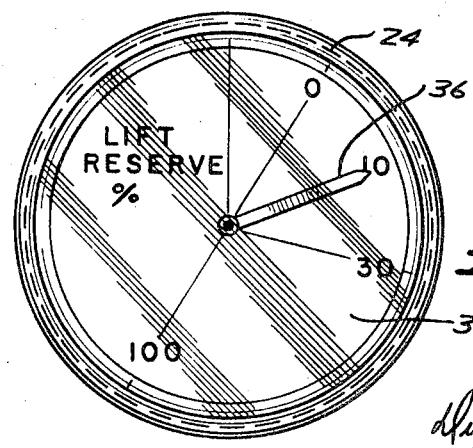
FIG. 2 is a view of the dial face showing the units of calibration of the lift reserve indicator.

As shown in FIGURE 2, the dial face of the sensor is calibrated in percent. 100% represents 100 percent of the maximum certified weight of the aircraft in reserve lift. 30% and 10% are the same, means that a lift capability equal to 30 and 10 percent of the maximum certified weight of the aircraft remains, respectively. At 0 lift reserve it is shown that the aircraft is being operated up to its maximum potential insofar as its lift is concerned. Any operation beyond the zero point is strictly at the pilots own risk. The actual point of stall can also be indicated on the dial.

The zero point can be adjusted to fit particular situations. In most cases it will have some reasonable margin of safety although for military transport or cargo aircraft that operate on short fields, the margin of safety may be set very small.

A dial face can also be calibrated in other units, for example $V/V_s$ where velocity is the velocity of the aircraft in relation to $V_s$ which is the velocity of aircraft at stall. This term is used in pilot training at the present time and is familiar to modern fighter pilots, at least. At 0 lift reserve the unit would be calibrated to indicate $$\frac{V}{V_s} = 1.15.$$

In other words, the safe velocity would be 1.15 the velocity at stall. This would be the point of 0 lift reserve.

If desired, suitable stall warning equipment could also be used.

There are other variables which effect the 0 lift reserve point. One is Mach number. The $P_1 - P_2 = 0$ point will shift slightly with Mach number. This can be compensated for electrically if desired or the instrument can be calibrated in the range of operation of the aircraft which is normally occurred when the instrument is to be used. The errors arising because of different Mach numbers is not substantial across a reasonable range of Mach.

As stated previously, the flap setting also effects the point of 0 lift reserve. This can be compensated for merely by having a switch which will either change the calibration of the existing transducer or will cut in a second duplicate transducer which will read only when the flaps are actuated. The switch would be such that it would be operated when the flaps were set.

What is claimed is:

1. Sensor means to indicate the percentage of maximum lift being used by an aircraft in flight comprising a probe mounted on the exterior of the aircraft and having two spaced at least partially forwardly facing ports providing pressure $P_1$ and $P_2$, said probe being positioned with respect to the axis of the aircraft so that when the pressures at said two ports are equal, the aircraft will be at its maximum safe angle of attack, differential pressure sensor means for sensing differences in pressure between said two ports, and indicator means responsive only to the pressures sensed operable to provide a lift reserve signal corresponding to the formula $K_2(P_1-P_2)/K_3K_4$, said indicator means including means to provide the constants $K_2$, $K_3$ and $K_4$ according to the following formulas:

$(L_{sw}-L_w)$ lift reserve $=K_2q(\alpha_{sw}-\alpha_w)$
$P_1-P_2=K_3\alpha_1 q$
$\alpha_1=K_4(\alpha_{sw}-\alpha_w)$
where
$K_2=(dC_L/d\alpha)S$
$S$ = wing area
$dC_L/d\alpha$ = slope of curve plotted $C_L$ vs $\alpha$
$C_L$ = lift coefficient for the aircraft on which the sensor is mounted
$q$ = impact pressure
$\alpha_{sw}$ = wing angle at stall warning
$\alpha_w$ = wing angle
$\alpha_1$ = local flow angle
and $\alpha_1$ is 0 when $\alpha_w=\alpha_{sw}$.

References Cited

UNITED STATES PATENTS

| | | | |
|---|---|---|---|
| 2,538,303 | 1/1951 | Findley | 73—17 |
| 2,590,521 | 3/1952 | Dyche | 340—2 |
| 2,596,116 | 5/1952 | Bamber | 340—2 |
| 2,635,152 | 4/1953 | Dyche | 73—17 |
| 2,748,372 | 5/1956 | Bunds | 340—2 |
| 3,006,187 | 10/1961 | Wilkenson | 73—18 |
| 3,079,105 | 2/1963 | Raspet | 340—2 |
| 3,172,079 | 3/1965 | Gunson et al. | 340—2 |
| 3,327,529 | 6/1967 | Bowles et al. | 73—18 |

DONALD O. WOODIEL, Primary Examiner

U.S. Cl. X.R.

73—180

PO-1050
(5/69)

UNITED STATES PATENT OFFICE
CERTIFICATE OF CORRECTION

Patent No. 3,470,740      Dated October 7, 1969

Inventor(s) Richard V. DeLeo

It is certified that error appears in the above-identified patent and that said Letters Patent are hereby corrected as shown below:

Column 2, line 39, "airfold" should be --airfoil--.
Column 5, line 6, "$K_2q(\alpha_{sw} = \alpha_w)$ should be --$K_2q(\alpha_{sw} - \alpha_v$

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents